United States Patent
Clarke et al.

(10) Patent No.: US 10,628,178 B2
(45) Date of Patent: Apr. 21, 2020

(54) AUTOMATED USER INTERFACE ANALYSIS

(71) Applicant: International Business Machines Corporation, Armonk, NY (US)

(72) Inventors: Jacqueline Clarke, Southampton (GB); Kirstin E. Coppen, Winchester (GB); Martin A. Ross, Winchester (GB); Stephanie J. Strugnell, Winchester (GB); Claudia Walter, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 15/478,634

(22) Filed: Apr. 4, 2017

(65) Prior Publication Data

US 2018/0285128 A1 Oct. 4, 2018

(51) Int. Cl.
*G06F 9/451* (2018.01)
*G06F 11/36* (2006.01)
*G06F 8/38* (2018.01)

(52) U.S. Cl.
CPC ............... *G06F 9/451* (2018.02); *G06F 8/38* (2013.01); *G06F 11/3692* (2013.01)

(58) Field of Classification Search
CPC .. G06F 9/451; G06F 3/04817; G06F 11/3692; H04N 1/00501; G06N 99/005
See application file for complete search history.

(56) References Cited

U.S. PATENT DOCUMENTS

| 8,092,380 B2* | 1/2012 | Rothman | G06F 19/322 600/300 |
|---|---|---|---|
| 8,869,049 B1* | 10/2014 | Li | G06F 3/00 715/705 |
| 2004/0119756 A1* | 6/2004 | Kumhyr | G06F 9/451 715/837 |

(Continued)

OTHER PUBLICATIONS

Sitepoint website, How to make a few word bold in button text?, published Jul. 2006, https://www.sitepoint.com/community/t/how-to-make-a-few-word-bold-in-button-text/2714 (Year: 2006).*

(Continued)

*Primary Examiner* — Jennifer N To
*Assistant Examiner* — Eric J Yoon
(74) *Attorney, Agent, or Firm* — William H. Hartwell; Maxine L. Barasch; Keohane & D'Alessandro PLLC

(57) ABSTRACT

Disclosed embodiments provide automated techniques for evaluation of a user interface of a computer application. A computer function associated with a graphical element such as an icon or button is analyzed. The resultant text that appears as a result of invoking the button is analyzed and keywords are identified to determine a function type for the function. A graphical element category is determined for the button/icon that is invoked to produce the function. The graphical element category can be determined by analyzing underlying markup code for the button. Keywords pertaining to the button may be extracted from the markup code. The keywords from the button are compared with the keywords of the resulting function and a score is generated based on the amount of common keywords. The score is used as a criterion for a recommendation about the appropriateness of the button for use with the application function.

18 Claims, 15 Drawing Sheets

(56) References Cited

U.S. PATENT DOCUMENTS

| | | | | |
|---|---|---|---|---|
| 2010/0057646 A1* | 3/2010 | Martin | ................... | G16H 15/00 |
| | | | | 706/11 |
| 2011/0131551 A1 | 6/2011 | Amichai et al. | | |
| 2013/0055117 A1* | 2/2013 | Sahibzada | ................. | G06F 8/38 |
| | | | | 715/762 |
| 2016/0179658 A1 | 6/2016 | Avery et al. | | |

OTHER PUBLICATIONS

C. Coyier, Bubble Point Tooltips with CSS3 & jQuery, published Nov. 17, 2011, downloaded from https://css-tricks.com/bubble-point-tooltips-with-css3-jquery/ (Year: 2011).*
Aurora Harley, "Usability Testing of Icons", Feb. 7, 2016, 4 pages.
Google Search Help, "Search for images with reverse image search", https://support.google.com/websearch/answer/1325808?hl=en, 3 pages.
Google, https://www.google.co.uk images—Google Search, 7 pages.
Noun Project, "Icons for everything", https://thenounproject.com/, Printed Jan. 16, 2018, 12 pages.
"Search by image", https://images.google.co.uk, 2 pages.
Wikipedia, "Tag cloud", https://en.wikipedia.org/wiki/Tag_cloud, Jun. 20, 2018, 9 pages.

* cited by examiner

AUTOMATED USER INTERFACE ANALYSIS

FIELD OF THE INVENTION

Embodiments of the present invention relate to automated user interface analysis.

BACKGROUND

In some enterprises, there can be a great many divisions, departments, offices, and employees. Policies may be put into place in an effort to keep things consistent across such lines. However, sometimes a person may miss a certain policy or choose not to follow it. In terms of user interfaces, inconsistency in how icons or other items are used across products has the potential to cause consumer confusion, and even confusion internally. There exists a need for improvements in user interface analysis.

SUMMARY

In one aspect, there is provided a computer-implemented method for user interface evaluation, comprising: analyzing a computer program function associated with a graphical element; determining a function type for the function; determining a graphical element category for the graphical element; performing a consistency check between the graphical element category and the function type; and providing a recommendation report regarding the use of the graphical element, based on the consistency check.

In another aspect, there is provided an electronic device for user interface evaluation comprising: a processor; a memory coupled to the processor, the memory containing instructions, that when executed by the processor, perform the steps of: analyzing a computer program function associated with a graphical element; determining a function type for the function; determining a graphical element category for the graphical element; performing a consistency check between the graphical element category and the function type; and providing a recommendation report regarding the use of the graphical element, based on the consistency check.

In yet another aspect, there is provided a computer program product for performing user interface evaluation on an electronic computing device, the electronic computing device comprising a computer readable storage medium having program instructions embodied therewith, the program instructions executable by a processor to cause the electronic computing device to: analyze a computer program function associated with a graphical element; determine a function type for the function; determine a graphical element category for the graphical element; perform a consistency check between the graphical element category and the function type; and output a recommendation report regarding the use of the graphical element, based on the consistency check.

BRIEF DESCRIPTION OF THE DRAWINGS

Features of the disclosed embodiments will be more readily understood from the following detailed description of the various aspects of the invention taken in conjunction with the accompanying drawings.

Figure 1:
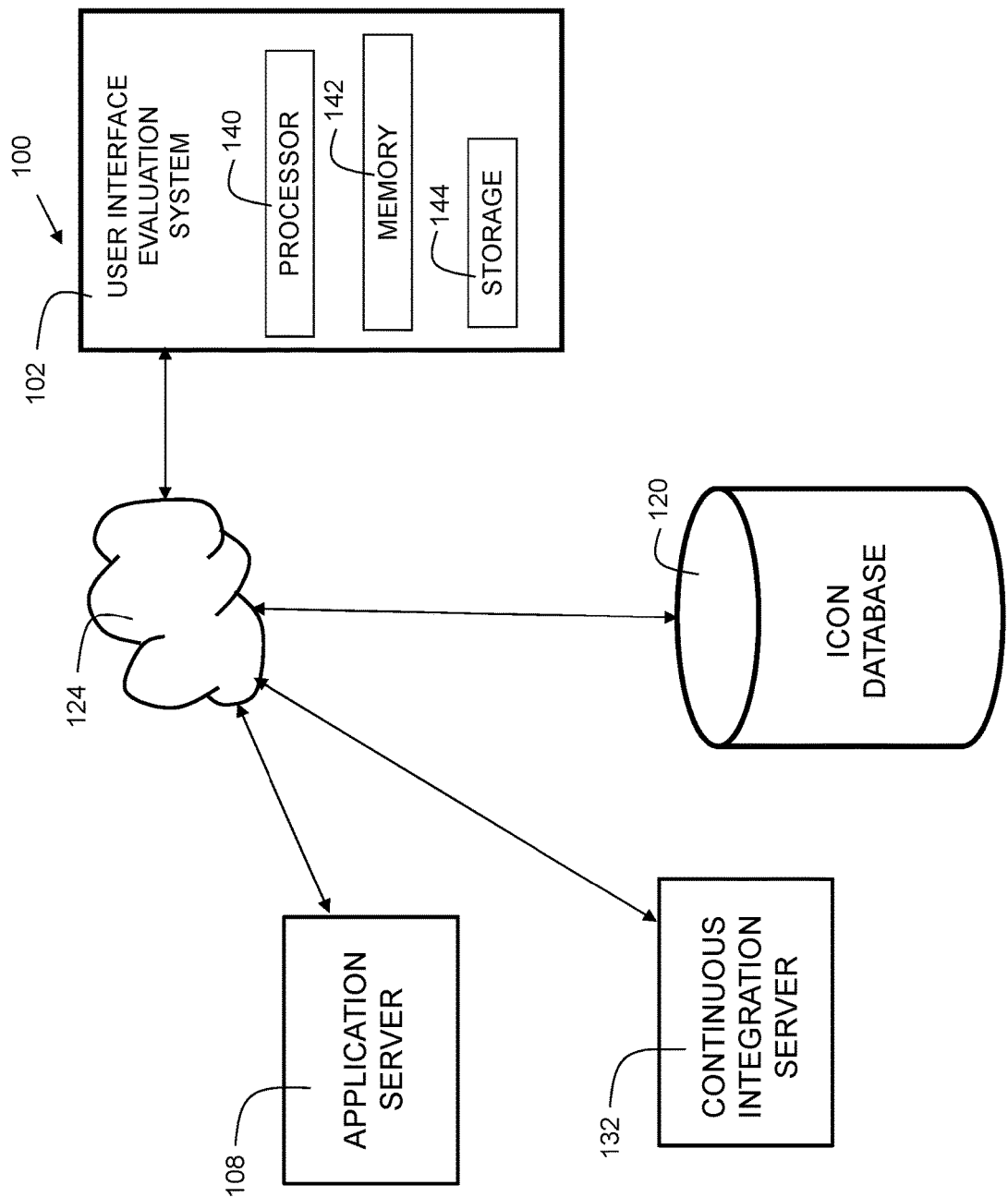
FIG. 1 illustrates an environment in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide automated techniques for evaluation of a user interface of a computer application. A computer function associated with a graphical element such as an icon or button is analyzed. The resultant text that appears as a result of invoking the button is analyzed and keywords are identified to determine a function type for the function. For example, if the text contains keywords such as name, address, and occupation, it may be consistent with a user profile entry page of an application. A graphical element category is determined for the button/icon that is invoked to produce the function. The graphical element category can be determined by analyzing underlying markup code for the button. Keywords pertaining to the button may be extracted from the markup code. Additionally, a computer-implemented image analysis for the button may be performed to recognize shapes and/or colors used for the button. These colors and/or shapes may be checked against a database of icons. The icons in the database may have associated metadata, such as keywords indicating intended purpose(s). The keywords from the button are compared with the keywords of the resulting function and a score is generated based on the amount of common keywords. The score is used as a criterion for a recommendation about the appropriateness of the button for use with the application function. In this way, user interface designs can be evaluated for consistency and clarity, resulting in an improved user/customer experience with the computer application.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 illustrates an environment 100 in accordance with embodiments of the present invention. User interface evaluation system 102 may be an electronic device that includes processor 140, memory 142, and storage 144. User interface evaluation system 102 is in communication with network 124. Network 124 may be the Internet, a wide area network, a local area network, a cloud computing network, an intra-enterprise network, or any other suitable network or combination thereof. Application server 108, hosting a website and/or application, and icon database 120 is in communication with the network, as well. The icon database 120 stores icons and metadata associated with the icons. An icon is a small graphical element, included as part of a program, that when invoked (e.g., selected, or clicked on), causes the execution of a computer program function, for example, to run or open a file.

In some embodiments, system 102 performs the following steps: A computer program function associated with a graphical element is analyzed. A function type for the function is determined. A graphical element category for the graphical element is determined. A consistency check between the graphical element category and the function type is performed, resulting in a score. A recommendation report regarding the use of the graphical element is provided. The recommendation report is based on the consistency check.

In some embodiments, the system 102 performs an analysis of the appropriateness of graphical elements in their context. This may include analyzing text that is present on the same screen/display as the graphical element. The analysis of the text can include natural language processing, entity detection, and/or additional keyword extraction techniques. The keywords are then compared with keywords that are associated with the graphical element. The level of commonality between the two sets of keywords can be used as a measure of the appropriateness of the graphical element for that context.

In some embodiments, system 102 performs the following steps: A computer program function associated with a graphical element is analyzed. A function type for the function is determined. A graphical element category for the graphical element is determined. A consistency check between the graphical element category and the function type is performed, resulting in a score. In these embodiments, the system 102 can be configured to make automatic corrections instead of, or in addition to, creation of a recommendation report. Examples can include switching in an appropriate icon from the database that provides a confidence score greater than the configured threshold and conforms to stylistic checks. In embodiments, this may be implemented by triggering an updated version of markup code to be loaded onto the application server 108. In embodiments, a continuous integration server 132 may be in communication with the user interface evaluation system 102. In embodiments, the continuous integration server 132 may be implemented as a Jenkins server. The updated markup code can refer to different icons. In this manner, applications can be updated automatically by a computer-implemented method, thereby reducing the time where the inappropriate icons/graphical elements are displayed.

Figure 2:
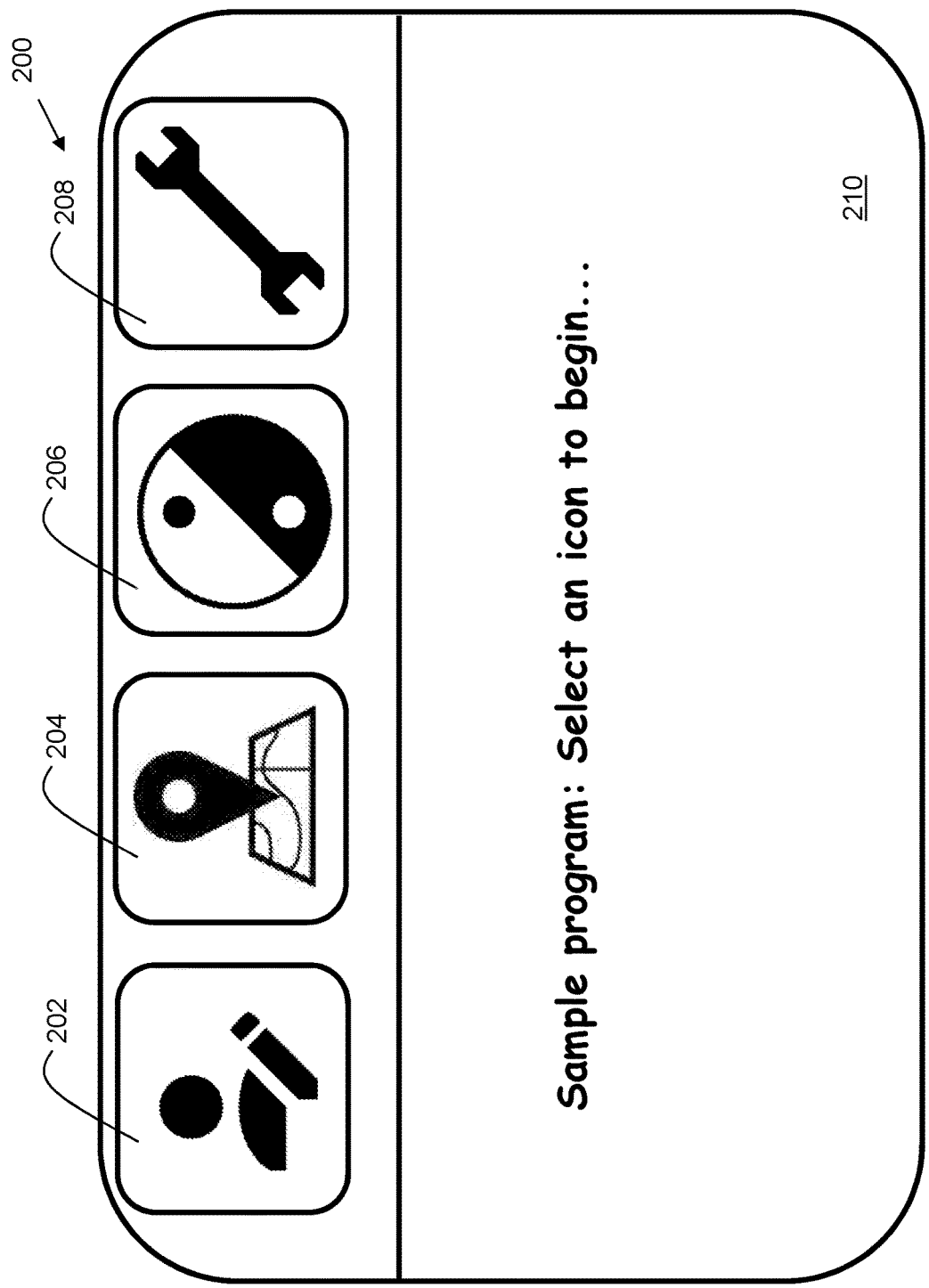
FIG. 2 illustrates an exemplary program for user interface evaluation with embodiments of the present invention.

FIG. 2 illustrates an exemplary program for user interface evaluation with embodiments of the present invention. Four icons are shown in the example 200. A first button 202 includes an icon of an outline of a person and a writing utensil. A second button 204 includes an icon of a map. A third button 206 includes a pattern icon. A fourth button 208 includes an icon of a wrench. Section 210 includes information instructing the user to select an icon to begin the process. Once a button is selected/pressed, information is displayed in the area of 210 associated with the button.

In some embodiments, determining the function type comprises performing a natural language processing process to identify one or more function keywords. Metadata associated with buttons may be used for one or more machine learning classifiers. The classifiers may include, but are not limited to, decision trees, naive Bayes classifiers, Maximum Entropy classifiers, decision trees, and/or support vector machine classifiers. Thus, some embodiments include performing a computerized natural language analysis process by using a naive Bayes classifier. Some embodiments include performing a computerized natural language analysis process by using a support vector machine classifier.

Training data is input to a training pipeline, and its output is compared with verification data. The classifiers may be adjusted until the verification data is satisfactorily classified. Once trained, an input query can be input to the system and compared against the classified data from the icon database 120. The classified data is input to a data analysis and rules engine which analyzes various patterns and anti-patterns in the data from the data repository. The input query can include, but is not limited to, markup code, tooltip text, etc. Using machine learning techniques, the system can improve over time as more and more icons are analyzed.

Figure 3:
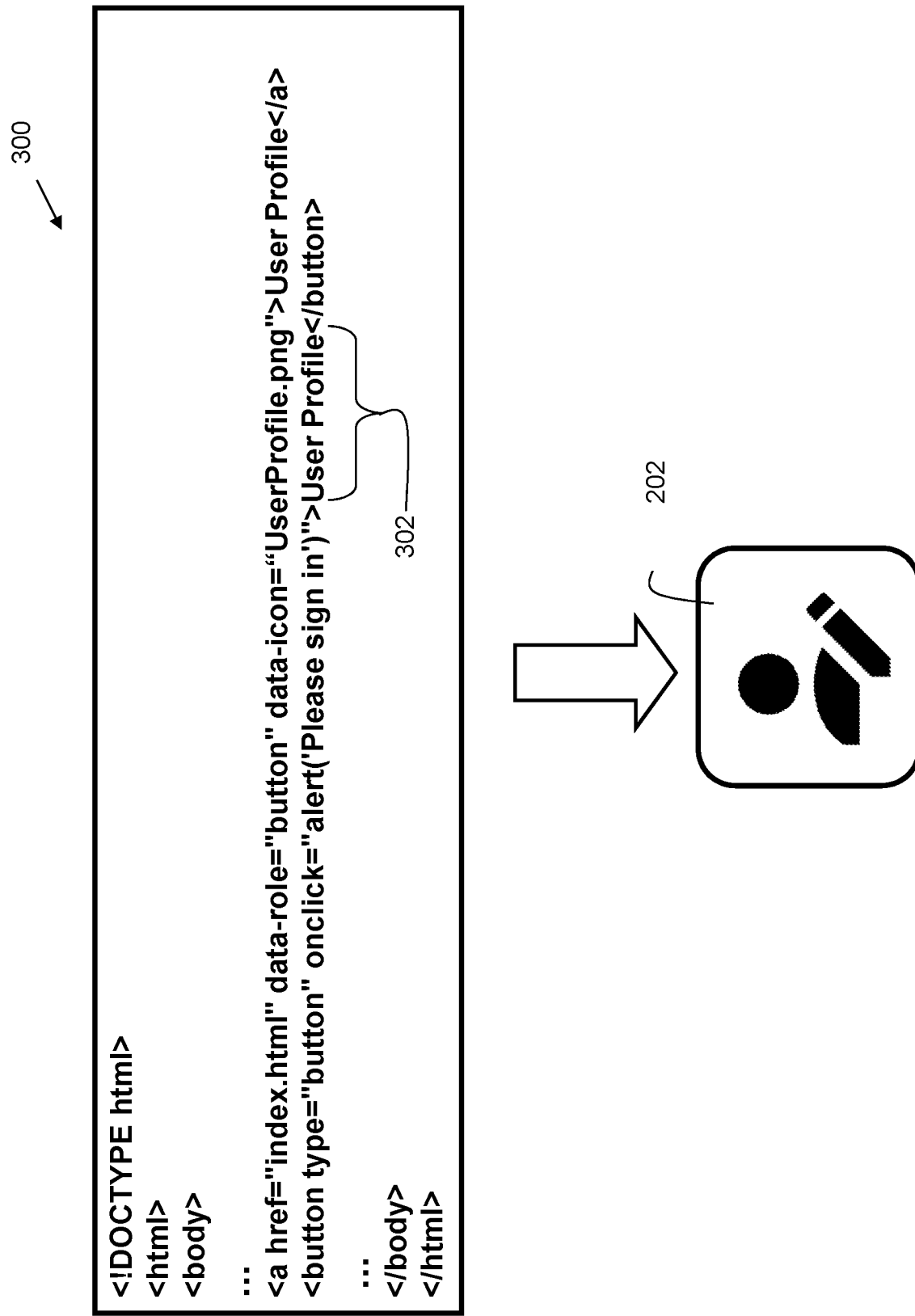
FIG. 3 shows an example of markup code and an associated user interface button.

FIG. 3 shows a diagram 300 of an example of markup code and an associated user interface button 202. In some embodiments, determining the graphical element category comprises performing a parsing of associated markup code. A page's mark-up code can be reviewed to determine more information about a button (or other item on the page). In the example, the button's markup code at 302 recites, "User Profile". This is indicative that, when the user selects button 202, it will cause the computer to access the user's User Profile page, which may contain information about the user.

Figure 4:
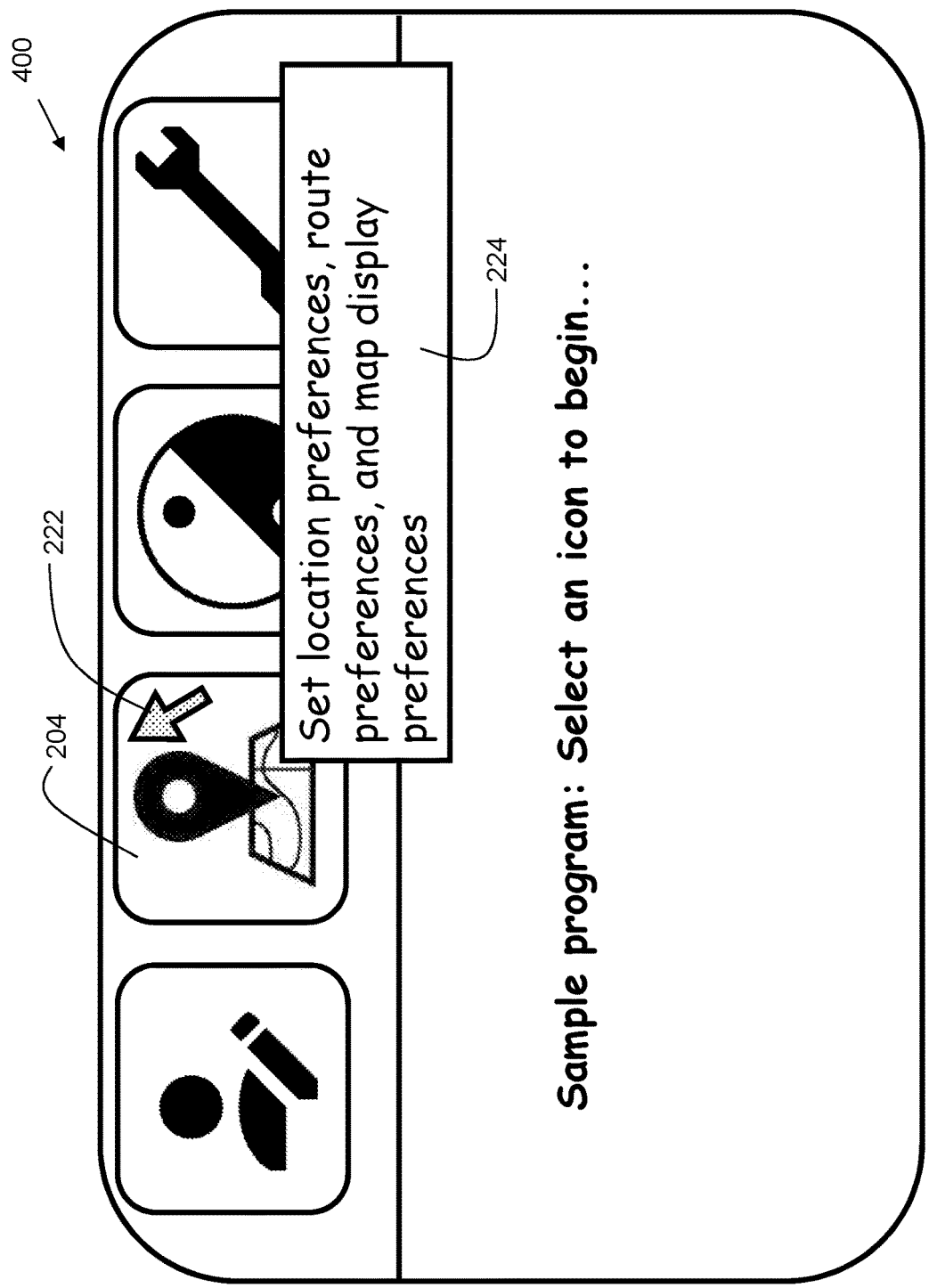
FIG. 4 illustrates an exemplary program for user interface evaluation with embodiments of the present invention including a tooltip.

FIG. 4 illustrates a diagram 400 of an exemplary program for user interface evaluation with embodiments of the present invention including a tooltip. Cursor 222 is shown disposed over button 204. This causes a tooltip 224 to appear. A tooltip is a message that appears when a cursor is positioned over an icon, image, hyperlink, or other element in a graphical user interface. The tooltip may include information or clues regarding a button's function. In the example, the text of tooltip 224 includes "Set location preferences, route preferences, and map display preferences."

Figure 5:
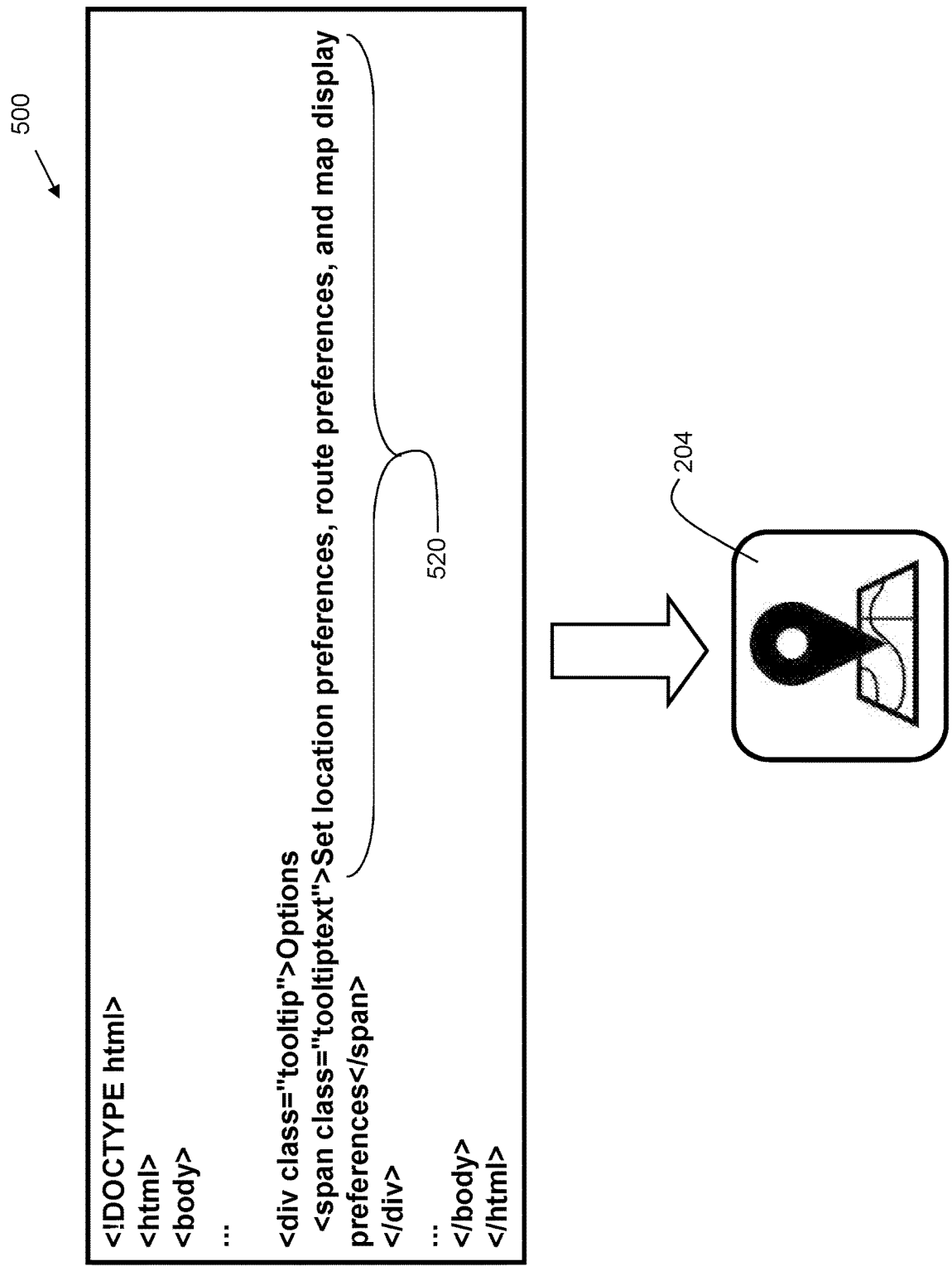
FIG. 5 shows another example of markup code and an associated user interface button.

FIG. 5 shows a diagram 500 of another example of markup code and an associated user interface button 204. In some embodiments, determining the graphical element category comprises parsing tooltip text. In the example, the mark-up code associated with the tooltip text is shown at 520. Similarly to FIG. 4, it includes "Set location preferences, route preferences, and map display preferences."

Figure 6:
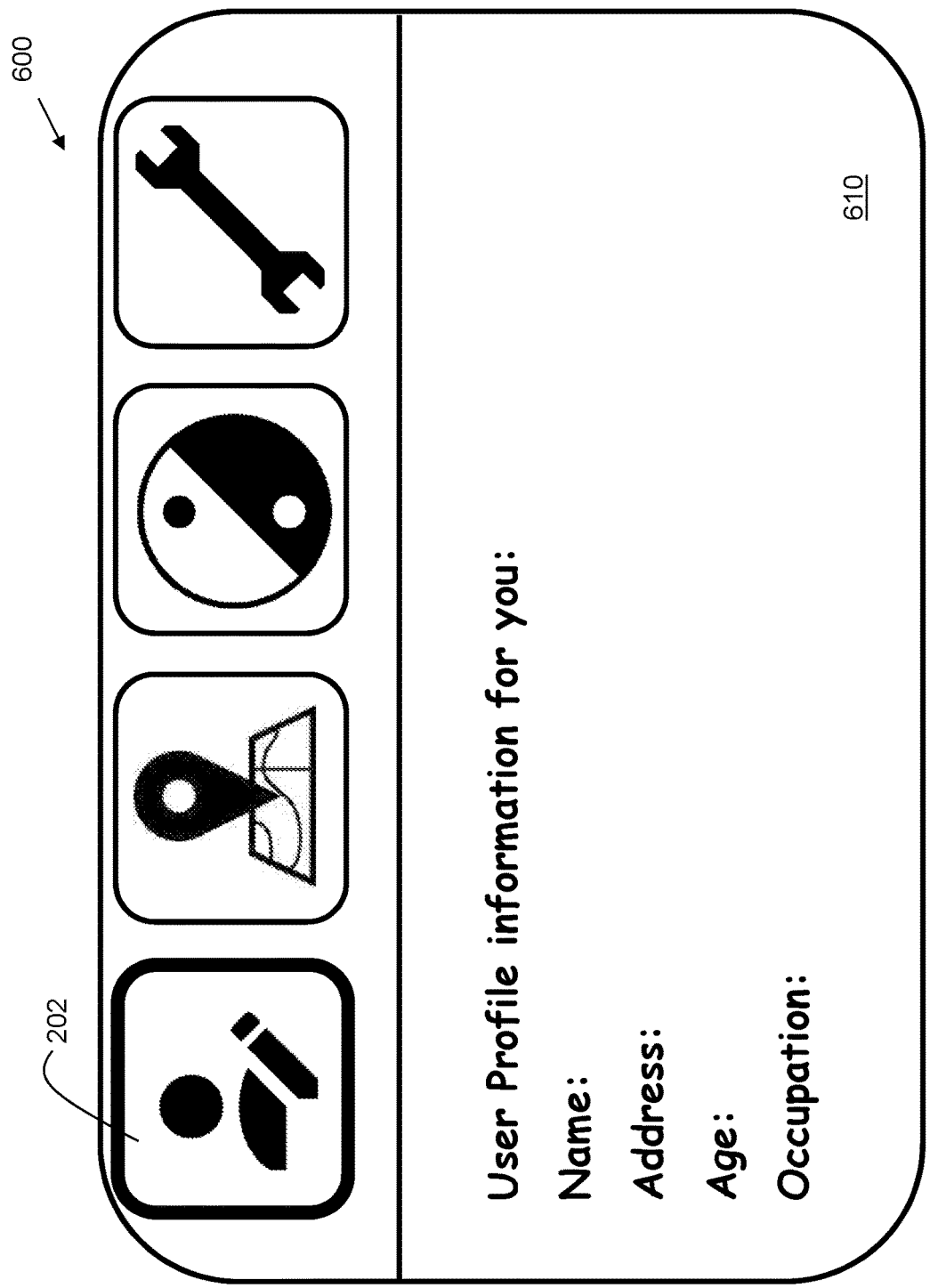
FIG. 6 illustrates an exemplary program for user interface evaluation after a first user interface button is selected.

FIG. 6 illustrates an exemplary diagram 600 of a program for user interface evaluation after a first user interface button 202 is selected by a user (or automated program macro). In response to the selection, user interface section 610 is displayed, including fields for user profile information, such as name, address, age, and occupation. This section is a "User Profile" page.

Figure 7:
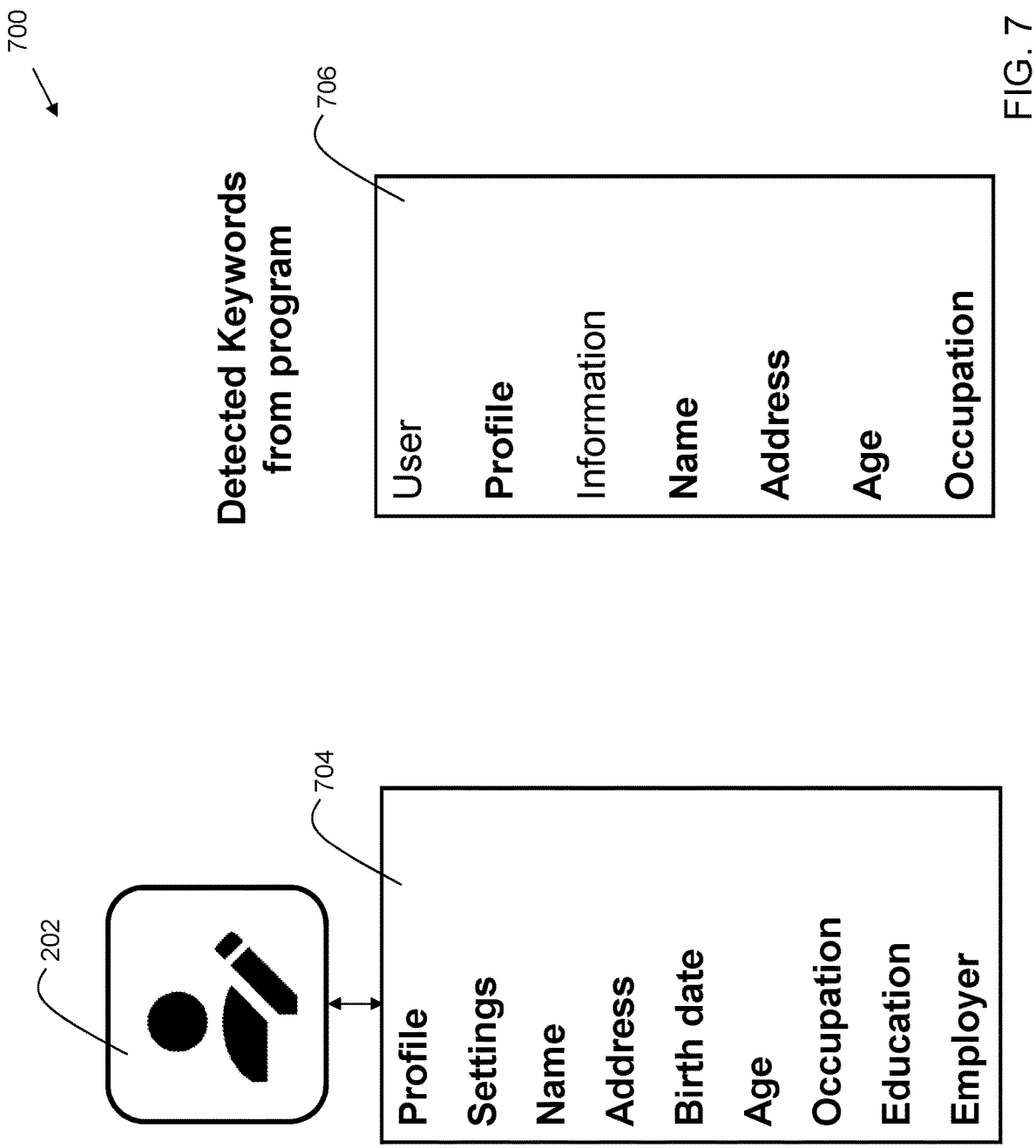
FIG. 7 illustrates keyword analysis of the first user interface button and corresponding function keywords.

FIG. 7 illustrates an example 700 of keyword analysis of the first user interface button 202 and corresponding function keywords. Embodiments can include performing a natural language processing process to identify one or more function keywords. Embodiments include determining a function type for the function. This can be based on the detected function keywords. At 704, there is shown a list of the keywords typically associated with the graphical element category of button 202. These keywords may be manually entered by human coders, and/or derived from associated markup code such as tooltip text. As shown at 706, there is shown the keywords detected from the program in relation to the button (i.e., from section 610 of FIG. 6), indicating function type. The keywords were scraped from the graphical user interface of FIG. 6.

Embodiments include performing a consistency check between the graphical element category and the function type. In the example shown at FIG. 7, the words, "Profile", "Name", "Address", "Age", and "Occupation" are in bold at 706 because they match against words existing in the graphical element category at 704. The words "User" and "Information" are shown in regular font because they do not have a match in the graphical element category keywords at 704. The use of bold font is exemplary and used for the purposes of disclosure. It is not meant to be limiting. Any way of denoting the match is included within the scope of the invention.

Figure 8:
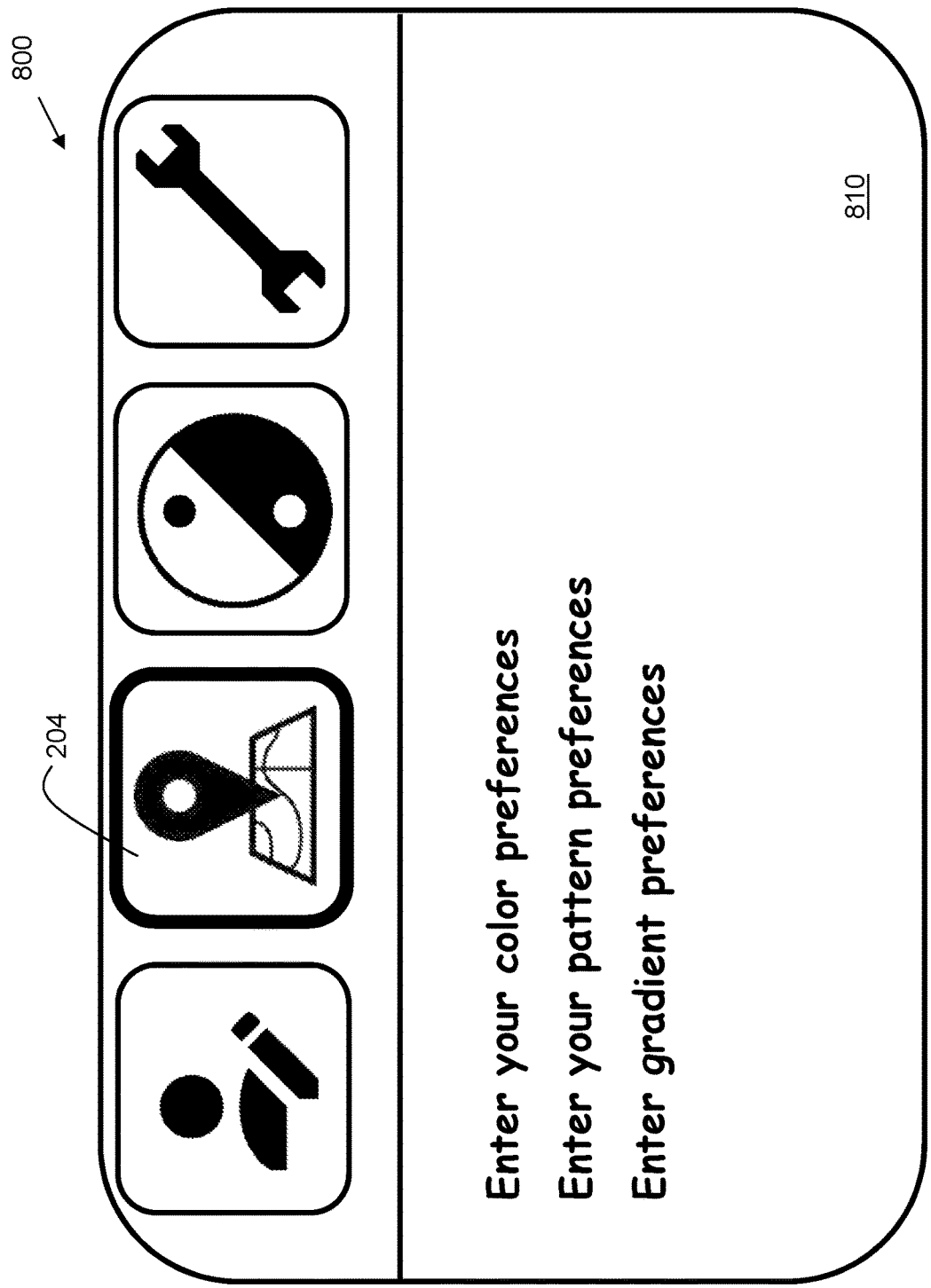
FIG. 8 illustrates an exemplary program for user interface evaluation after a second user interface button is selected.

FIG. 8 illustrates an exemplary program 800 for user interface evaluation after a second user interface button 204 is selected. Button 204 is selected by the user, as indicated by its bolded outline. In response to its selection, user interface section 810 is displayed. Information displayed in section 810 includes a form for a user to enter color preferences, pattern preferences, and gradient preferences. Section 810 is a "preferences page".

Figure 9:
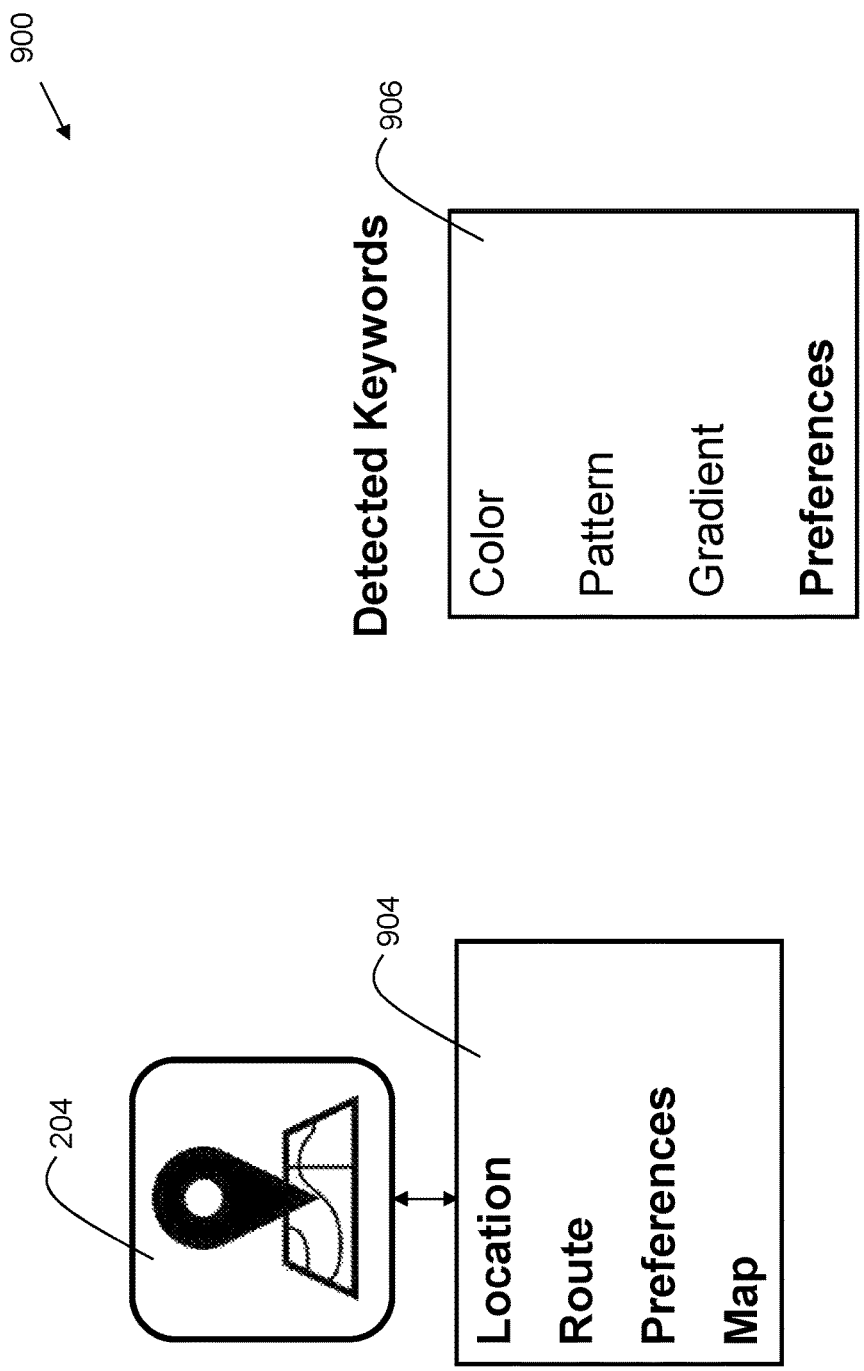
FIG. 9 illustrates keyword analysis of the second user interface button and corresponding function keywords.

FIG. 9 illustrates an example 900 of keyword analysis of the second user interface button 204 and corresponding graphical element category keywords. The graphical element category keywords are detected from FIG. 5 in the tooltip text 520 of the markup code. At 904, keywords relating to maps are detected, including: "location", "route", "preferences", and "map". At 906, there is shown the function keywords detected from user interface section 810 of FIG. 8. They include: "color", "pattern", "gradient", and "preferences". Embodiments include performing a consistency check between the graphical element category and the function type. As indicated by the bold font of function keyword "preferences" at 906, only that function keyword matches a graphical element category keyword at 904. The function keywords, "color", "pattern", and "gradient" are not part of the graphical element category. As the color, pattern, and gradient selections have little relation to functions typically associated with a map icon such as shown in button 204, the button is likely to cause confusion for a user, and hence should be indicated accordingly in the recommendation report.

Figure 10:
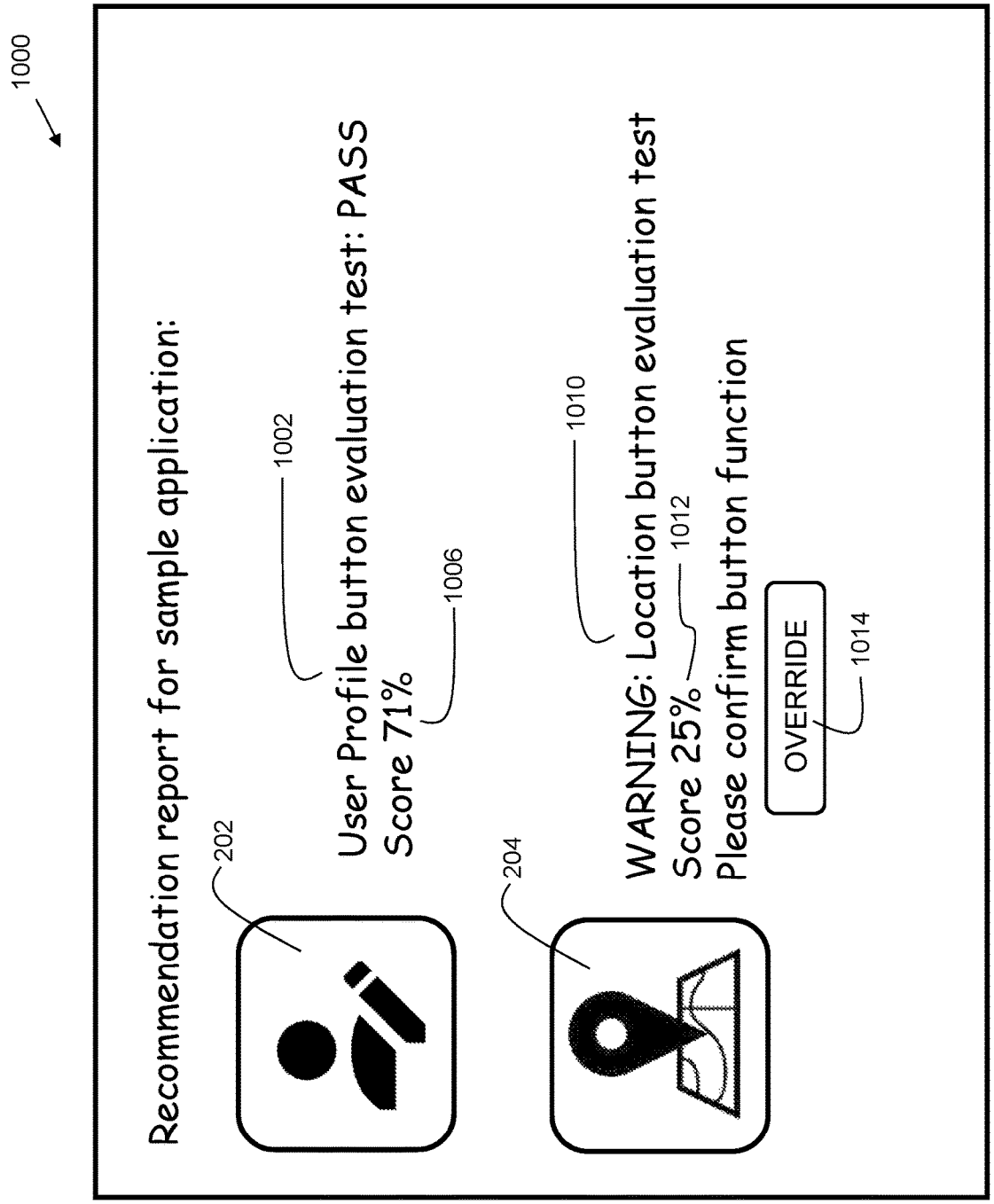
FIG. 10 illustrates a portion of an exemplary recommendation report showing results for the first button and the second button.

FIG. 10 illustrates a portion of an exemplary recommendation report 1000 showing results for the first button 202 and the second button 204. Embodiments include generating a consistency score based on the consistency check. In embodiments, the recommendation report 1000 includes the consistency score. Thresholds may be set for the recommendation based on the score. In the example, the threshold is set to 65%. If the score is below 65%, then a warning notification is issued. If it is equal to or above 65%, then a pass notification is issued.

With regard to button 202, for the User Profile button evaluation test 1002, a pass notification is shown. The score 1006 is 71%. In the example, the score is calculated by dividing the number of matching function keywords by the total number of function keywords and multiplying by 100. In the example shown in FIG. 7, there are 5 function keywords with matches in the graphical elements keywords. The total number of function keywords is 7. Therefore, 5 is divided by 7, which is equal to 0.71. This number is then multiplied by 100 for a final score of 71%. It should be recognized that this method of calculating a score is exemplary, and that other methods are included within the scope of the invention.

With regard to button 204, for the location button evaluation test 1010, a warning notification is issued. The score 1012 of 25% is well below the 65% threshold. In the example, the score is calculated by dividing the number of matching function keywords by the total number of function keywords and multiplying by 100. In the example shown in FIG. 9, there is one function keyword with a match in the graphical elements keywords. The total number of function keywords is four. So, 1 is divided by 4, which is equal to 0.25. This number is then multiplied by 100 for a final score of 25%.

In some embodiments, when a warning is issued, there is provided an "override" option on the display in proximity to the warning. The override option is shown here as button 1014. This allows the user to ignore the warning, and keep the icon "as is" even though it appears to be used in an unconventional manner. Embodiments may include accepting an override instruction from the user, and recording the user override. The override is recorded and over time, through machine learning, the icon may be associated with the graphical element keywords for the function. For example, if the warning is overridden three times out of five, the function keyword may be added to the graphical element keywords. Thus, embodiments include accepting a user override for a recommendation included in the recommendation report; and recording the user override. If no override is received, the recommendation is affirmed, which may also be recorded and used in machine learning.

Figure 11:
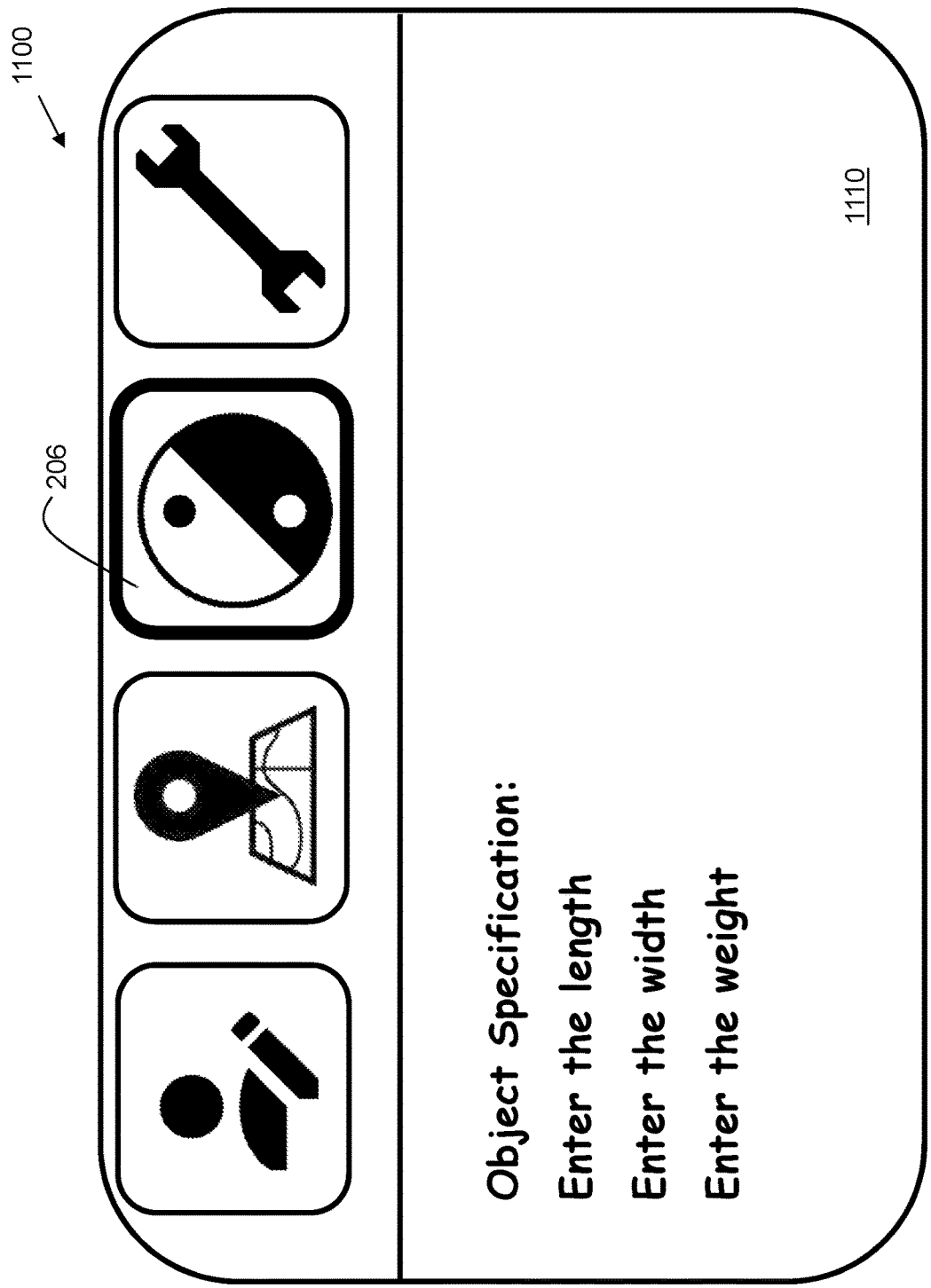
FIG. 11 illustrates an exemplary program for user interface evaluation after a third user interface button is selected.

FIG. 11 illustrates a diagram 1100 of an exemplary program for user interface evaluation after a third user interface button 206 is selected. In response to the selection, user interface section 1110 is displayed, including fields for Object Specification, such as "Enter the length", "Enter the width", and "Enter the weight". This section is an "Object" page.

Figure 12:
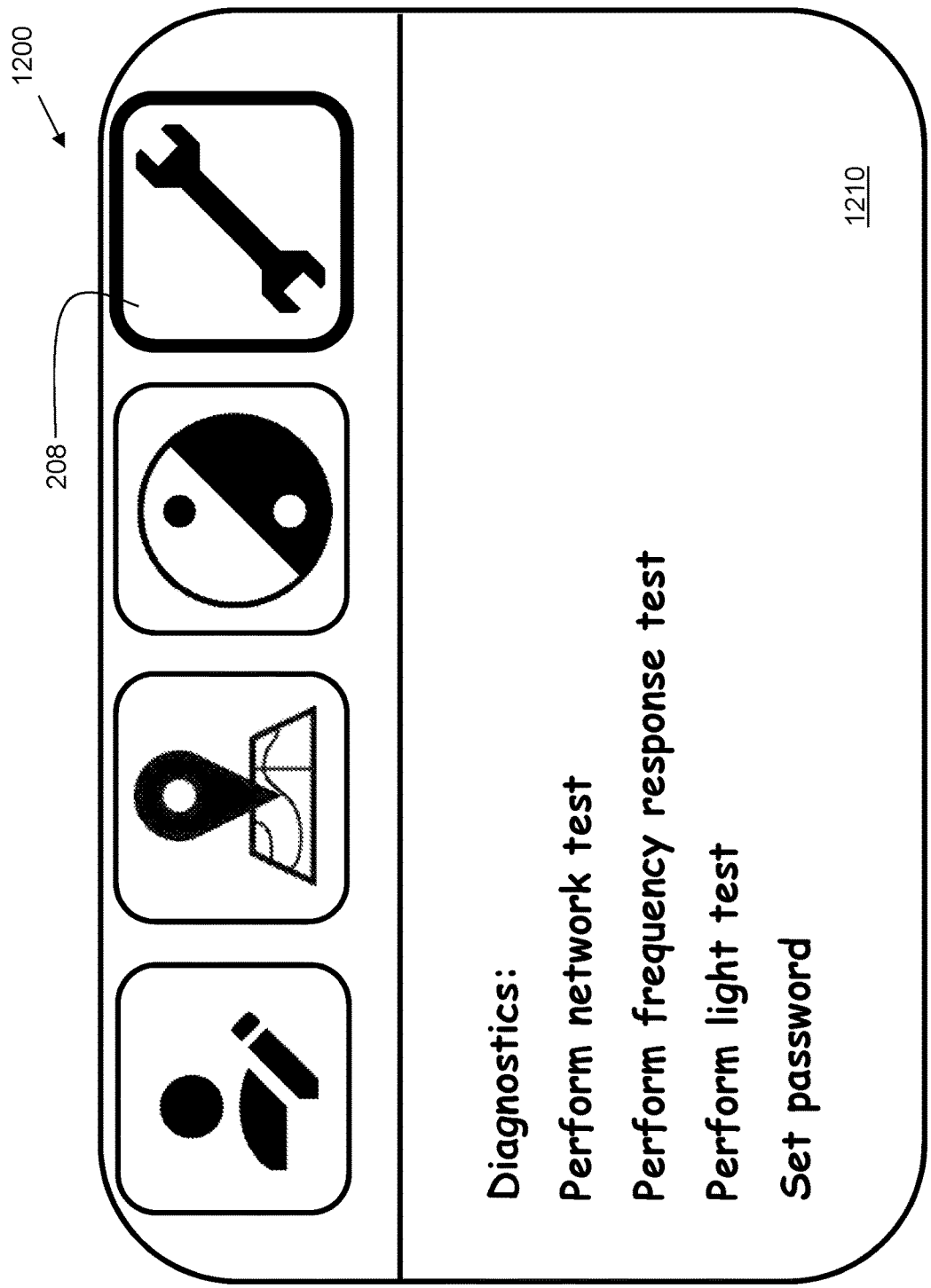
FIG. 12 illustrates an exemplary program for user interface evaluation after a fourth user interface button is selected.

FIG. 12 illustrates a diagram 1200 of an exemplary program for user interface evaluation after a fourth user interface button 208 is selected. In response to the selection, user interface section 1210 is displayed, including fields for Diagnostics, such as "Perform network test", "Perform frequency response test", "Perform light test", and "Set password". This section is a "Diagnostics" page.

Figure 13:
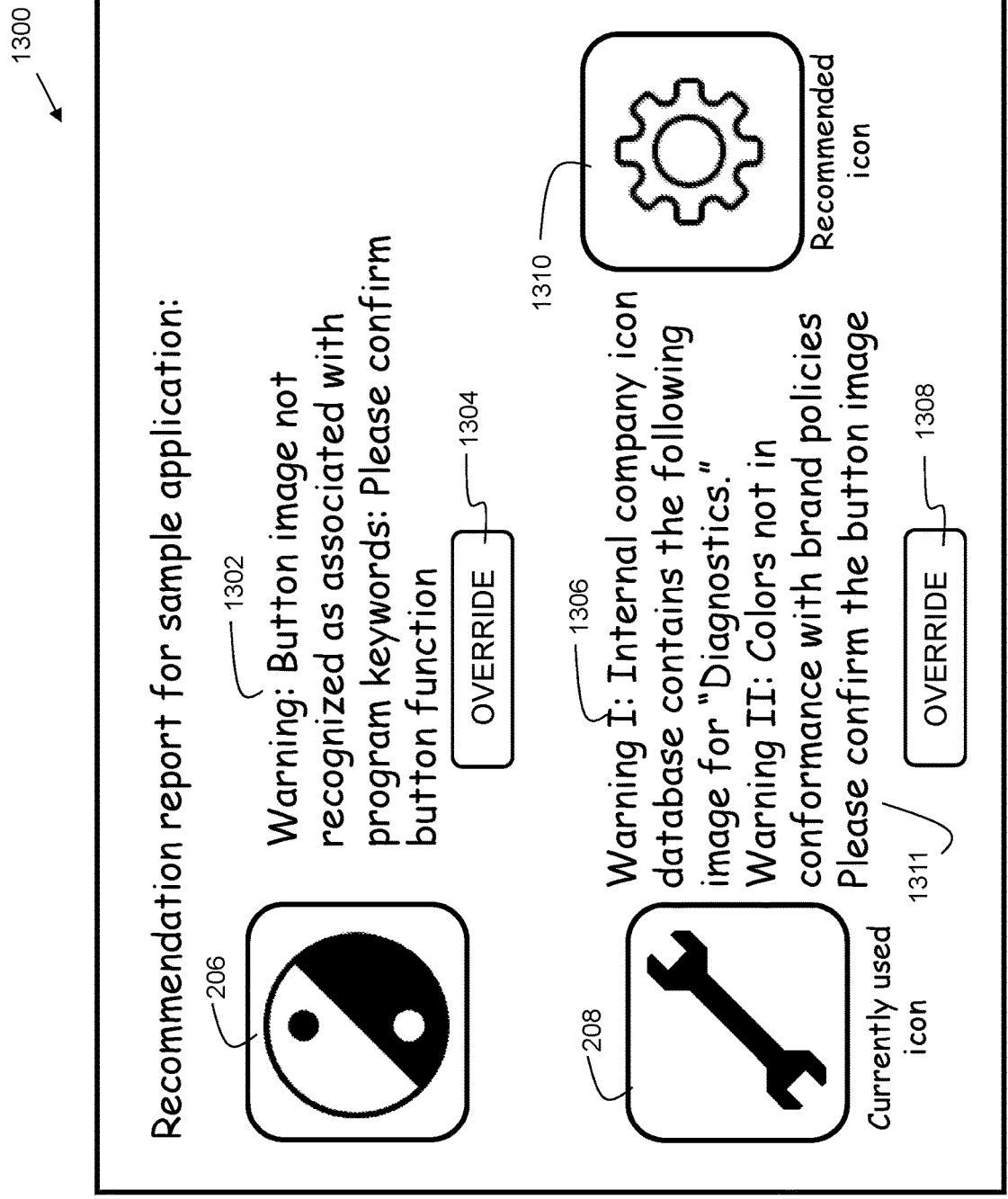
FIG. 13 illustrates another portion of an exemplary recommendation report showing results for the third button and the fourth button.

FIG. 13 illustrates a portion of an exemplary recommendation report 1300 showing results for the third button 206 and the fourth button 208. Embodiments include generating a consistency score based on the consistency check. In embodiments, the recommendation report 1300 includes the consistency score. Thresholds may be set for the recommendation based on the score. In the example, the threshold is set to 51%. If the score is below 51%, then a warning notification is issued. If it is equal to or above 51%, then a pass notification is issued.

With regard to third button 206, for the button evaluation test, a warning notification 1302 is shown. The score is 0%. An "override" option 1304 is provided on the display in proximity to the warning. The override option is shown here as button 1304. This allows the user to ignore the warning, and keep the icon "as is" even though it appears to be unrecognized.

With regard to button 208, for the button evaluation test, a warning notification 1306 is issued. The score is below the predetermined threshold. An override option 1308 is provided on the display in proximity to the warning. In some embodiments, a recommended icon 1310 is provided in proximity to the warning. The recommended icon may be selected according to an algorithm which compares graphical elements keywords with objects in the icon image. In some embodiments, the currently used icon 208 may be automatically replaced by the recommended icon 1310.

Embodiments may include performing a computer-implemented image recognition process on the graphical element (icon). Embodiments may include performing a stylistic consistency check of the graphical element. An object recognition process is performed on the button icon to identify one or more objects in the image. The object recognition process may perform a variety of image processing techniques such as edge detection, shape detection, clustering, and/or probabilistic classifiers to determine the icon shape and/or images within the icon. Image metadata is extracted from the received image based on the object recognition process.

The object recognition analysis may include performing an edge detection process to determine the outer edges of the objects in the icon. The icon database (FIG. 2) may include metadata about the stored icons and the objects therein. For example, the shape of a person's head may be stored in association with a user profile icon (like that of button 202). For edge detection, some embodiments may utilize a Canny edge detector algorithm. Some embodiments may utilize mathematical models, such as a deformable contour model, and/or an active shape model for detection of the icon image.

In some embodiments, performing an object recognition process further comprises using one or more image classifiers. The image classifiers can be trained using a supervised learning technique.

In the example of FIG. 13, graphical element keywords relating to diagnostics are detected by computerized object recognition analysis and compared to a database (e.g., database 120 (of FIG. 1)). The database may have metadata, including keywords stored in association with icon images. The gear icon 1310 is determined to be associated with the diagnostics keywords, and is presented on report 1300.

In some embodiments, a stylistic consistency check may further include performance of a color analysis. Icon database 120 (FIG. 2) may include information about colors of the icons as well as standard colors used by the enterprise (e.g., for branding purposes). If the colors blue and yellow are typically used in application icons for a particular company and yellow is absent from one icon on a user interface, the icon may be flagged for possible editing in the recommendation report, as shown at "Warning II" of 1311. Thus, a stylistic consistency check may be performed in some embodiments.

Figure 14:
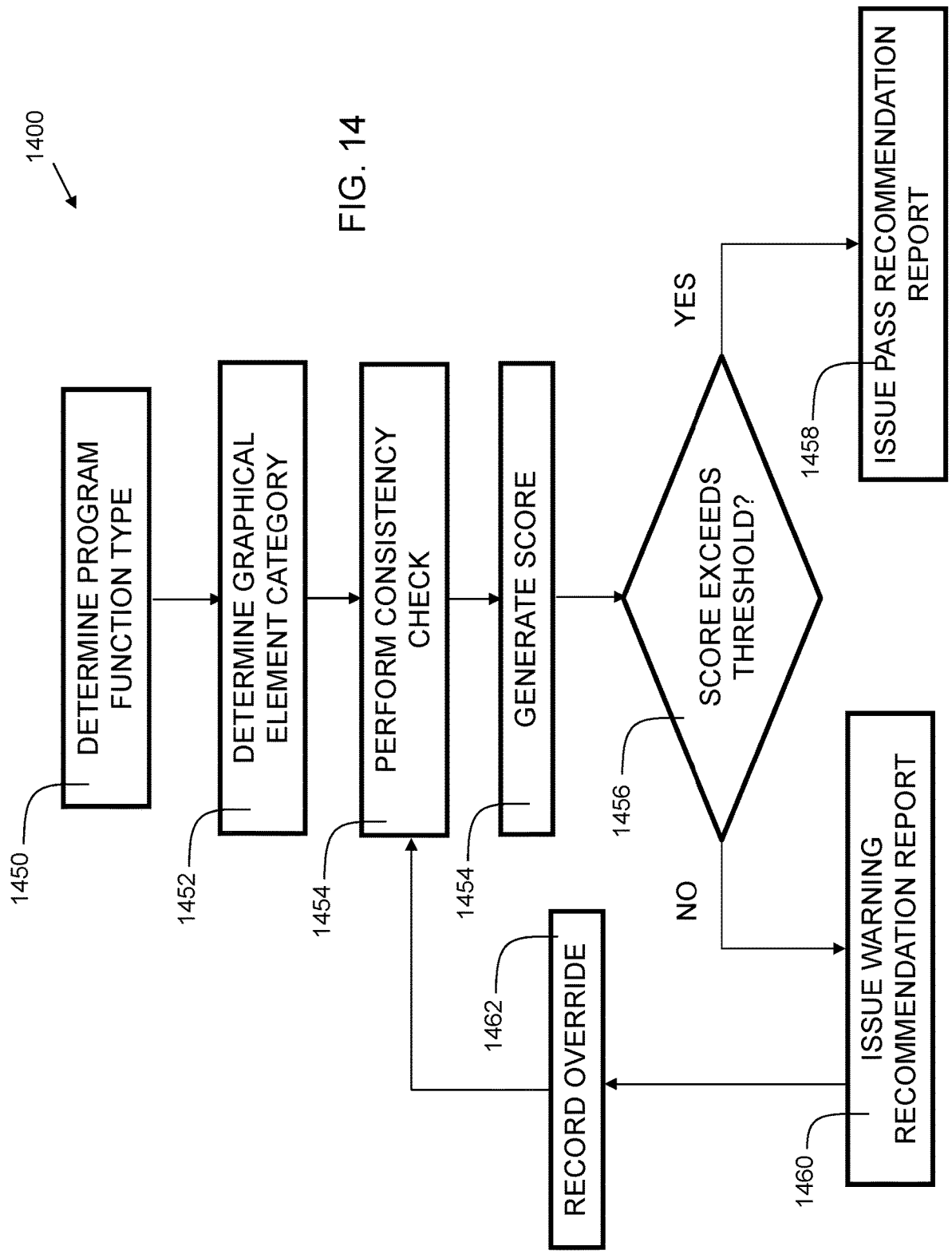
FIG. 14 is a flowchart indicating process steps for embodiments of the present invention.

FIG. 14 is a flowchart 1400 indicating process steps for embodiments of the present invention. At 1450, a program function type is determined. At 1452, a graphical element category is determined. At 1454, a consistency check is performed. At 1454, a score is generated. At 1456, it is determined whether the score exceeds a threshold. If so, at 1458, a pass recommendation report is issued. If not, at 1460, a warning recommendation report is issued. If an override instruction is received, then it is recorded at 1462, and proceeds to box 1454. Embodiments may include adjusting the recommendation in response to receiving a predetermined amount of user overrides. The adjusting may be applied on a future user interface analysis. While the aforementioned examples illustrate analysis of a user interface implemented as a web page on a computer, embodiments of the present invention may be used to analyze user interfaces on mobile devices such as smartphones and/or tablet computers.

Figure 15:
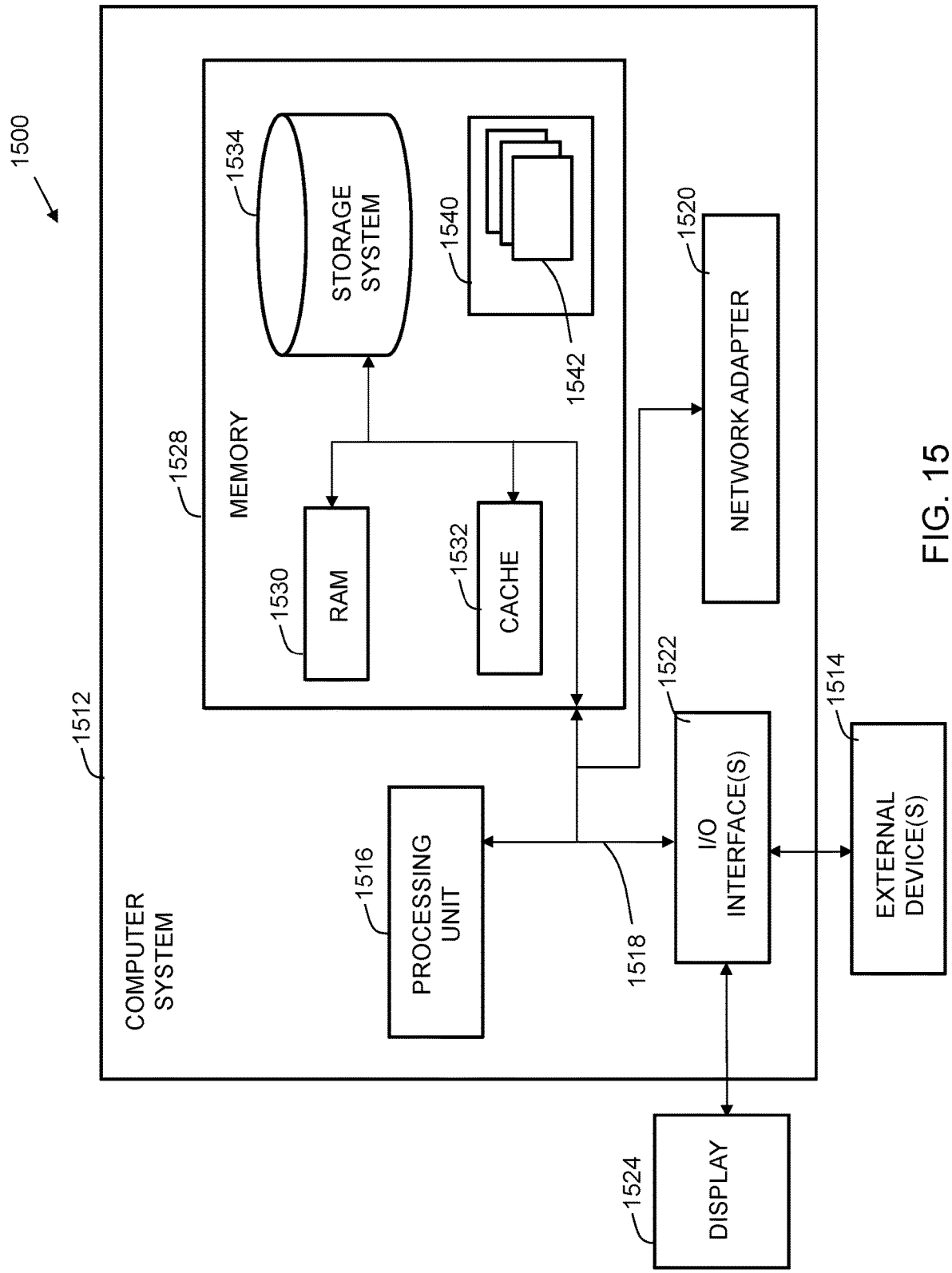
FIG. 15 shows additional details of an embodiment of the present invention

Referring now to FIG. 15, a computerized implementation 1510 of an embodiment for automated user interface analysis is described in further detail. Computerized implementation 1510 is only one example of a suitable implementation and is not intended to suggest any limitation as to the scope of use or functionality of embodiments of the invention described herein. Regardless, computerized implementation 1510 is capable of being implemented and/or performing any of the functionality set forth hereinabove.

In computerized implementation 1510, there is a computer system 1512. Examples of well-known computing systems, environments, and/or configurations that may be suitable for use with computer system 1512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 1512 is intended to demonstrate that some or all of the components of implementation 1510 could be deployed, managed, serviced, etc., by a service provider who offers to implement, deploy, and/or perform the functions of the present invention for others.

Computer system 1512 is intended to represent any type of computer system that may be implemented in deploying/realizing the teachings recited herein. Computer system 1512 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 1512 represents an illustrative system for gathering time-annotated web interaction and biometric sensor data of web page users to extrapolate emotional responses to a web page and generating an aggregated emotional map indicative of the emotional responses. It should be understood that any other computers implemented under the present invention may have different components/software, but can perform similar functions.

Computer system 1512 in computerized implementation 1510 is shown in the form of a general-purpose computing device. The components of computer system 1512 may include, but are not limited to, one or more processors or processing units 1516, a system memory 1528, and a bus 1518 that couples various system components including system memory 1528 to processor 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 1516 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 1516 collects and routes signals representing inputs and outputs between external devices 1514 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 1516 executes computer program code, such as program code for gathering time-annotated web interaction and biometric sensor data of web page users to extrapolate emotional responses to a web page and generating an aggregated emotional map indicative of the emotional responses, which is stored in memory 1528, storage system 1534, and/or program/utility 1540. While executing computer program code, processing unit 1516 can read and/or write data to/from memory 1528, storage system 1534, and program/utility 1540.

Computer system 1512 typically includes a variety of computer system readable media. Such media may be any available media that is accessible by computer system 1512, and it includes both volatile and non-volatile media, removable and non-removable media.

System memory 1528 can include computer system readable media in the form of volatile memory, such as random access memory (RAM) 1530 and/or cache memory 1532. Computer system 1512 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the invention. Program code embodied on a computer readable medium may be transmitted using any appropriate medium including, but not limited to, wireless, wireline, optical fiber cable, radio-frequency (RF), etc., or any suitable combination of the foregoing.

Program/utility 1540, having a set (at least one) of program modules 1542, may be stored in memory 1528 by way of example, and not limitation. Memory 1528 may also have an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system 1512 may also communicate with one or more external devices 1514 such as a keyboard, a pointing device, a display 1524, etc.; one or more devices that enable a consumer to interact with computer system 1512; and/or any devices (e.g., network card, modem, etc.) that enable computer system 1512 to communicate with one or more other computing devices. Such communication can occur via I/O interfaces 1522. Still yet, computer system 1512 can communicate with one or more networks such as a local area network (LAN), a general wide area network (WAN), and/or a public network (e.g., the Internet) via network adapter 1520. As depicted, network adapter 1520 communicates with the other components of computer system 1512 via bus 1518. It should be understood that although not shown, other hardware and/or software components could be used in conjunction with computer system 1512. Examples include, but are not limited to: microcode, device drivers, redundant processing units, external disk drive arrays, RAID systems, tape drives, and data archival storage systems, etc.

As can now be appreciated, disclosed embodiments provide automated techniques for analyzing the effectiveness of user interface icons. Computer-implemented methods are used to assess a purpose/function of an icon or user interface button, and a corresponding function that results from selection/activation of the button. This can be used to quickly identify buttons that are not well suited for their function. This allows application designers to make changes/repairs to the user interface to improve the user/customer experience with the application, resulting in reduced customer frustration and potentially increasing revenue due to increased use/sales.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for user interface evaluation, comprising:
    analyzing a computer program function associated with an icon, wherein the icon is a graphical element, included as part of a program, that when invoked, causes execution of the computer program function;
    determining a function type for the computer program function;
    analyzing the icon using image analysis;
    identifying objects, shapes, or colors based on the image analysis;
    comparing the identified objects, shapes, or colors to a database of icons stored with associated keywords;
    determining a graphical element category for the icon, wherein the graphical element category is derived from an analysis of underlying markup code for the icon;
    obtaining graphical element category keywords;
    obtaining function type keywords, and a total number of function type keywords;
    determining a number of matched keywords, wherein each matched keyword is both a graphical element category keyword and a function type keyword;
    performing a consistency check between the graphical element category and the function type;
    determining, based on the consistency check, a consistency score, wherein the consistency score is computed by dividing the number of matched keywords by the total number of function type keywords;
    providing a recommendation report regarding the use of the icon, based on the consistency score;
    in response to the score being below a threshold, including a warning in the recommendation report;
    receiving a user override for a recommendation included in the recommendation report; and
    adding keywords associated with the function type to a database including keywords corresponding to a function of the graphical element in response to a predetermined number of repetitions of the receiving the override.

2. The method of claim 1, wherein determining the function type comprises performing a natural language processing process to identify one or more function keywords.

3. The method of claim 2, wherein determining the graphical element category comprises performing a computer-implemented image recognition process on the graphical element.

4. The method of claim 3, further comprising performing a stylistic consistency check of the graphical element.

5. The method of claim 4, wherein performing the stylistic consistency check comprises performing a color analysis.

6. The method of claim 1, wherein determining the graphical element category comprises performing a parsing of the underlying markup code.

7. The method of claim 6, wherein the parsing of the underlying markup code comprises parsing button text.

8. The method of claim 6, wherein the parsing of the underlying markup code comprises parsing tooltip text.

9. The method of claim 1, further comprising:
accepting the user override for the recommendation included in the recommendation report; and
recording the user override.

10. The method of claim 9, further comprising adjusting the recommendation in response to receiving a predetermined amount of user overrides.

11. An electronic device for user interface evaluation comprising:
a processor;
a memory coupled to the processor, the memory containing instructions, that when executed by the processor, perform the steps of:
analyzing a computer program function associated with an icon, wherein the icon is a graphical element, included as part of a program, that when invoked, causes execution of the computer program function;
determining a function type for the computer program function;
analyzing the icon using image analysis;
identifying objects, shapes, or colors based on the image analysis;
comparing the identified objects, shapes, or colors to a database of icons stored with associated keywords;
determining a graphical element category for the icon, wherein the graphical element category is derived from an analysis of underlying markup code for the icon;
obtain graphical element category keywords;
obtain function type keywords, and a total number of function type keywords;
determine a number of matched keywords, wherein each matched keyword is both a graphical element category keyword and a function type keyword;
performing a consistency check between the graphical element category and the function type;
determining, based on the consistency check, a consistency score, wherein the consistency score is computed by dividing the number of matched keywords by the total number of function type keywords;
providing a recommendation report regarding the use of the icon, based on the consistency score;
in response to the score being below a threshold, including a warning in the recommendation report;
receiving a user override for a recommendation included in the recommendation report; and
adding keywords associated with the function type to a database including keywords corresponding to a function of the graphical element in response to a predetermined number of repetitions of the receiving the override.

12. The electronic device of claim 11, wherein the memory further contains instructions, that when executed by the processor, performs a natural language processing process to identify one or more function keywords to determine the function type.

13. The electronic device of claim 11, wherein the memory further contains instructions, that when executed by the processor, performs a parsing of the underlying markup code to determine the graphical element category.

14. The electronic device of claim 13, wherein the memory further contains instructions, that when executed by the processor, performs a parsing of associated button text.

15. The electronic device of claim 13, wherein the memory further contains instructions, that when executed by the processor, performs a parsing of associated tooltip text.

16. The electronic device of claim 13, wherein the memory further contains instructions, that when executed by the processor, performs a computer-implemented image recognition process on the graphical element to determine the graphical element category.

17. A computer program product for performing user interface evaluation on an electronic computing device, the electronic computing device comprising a computer readable storage medium having program instructions embodied therewith, the program instructions executable by a processor to cause the electronic computing device to:
analyze a computer program function associated with an icon, wherein the icon is a graphical element, included as part of a program, that when invoked, causes execution of the computer program function;
determine a function type for the computer program function;
analyze the icon using image analysis;
identify objects, shapes, or colors based on the image analysis;
comparing the identified objects, shapes, or colors to a database of icons stored with associated keywords;
determining a graphical element category for the icon, wherein the graphical element category is derived from an analysis of underlying markup code for the icon;
obtaining graphical element category keywords;
obtaining function type keywords, and a total number of function type keywords;
determining a number of matched keywords, wherein each matched keyword is a both a graphical element category keyword and a function type keyword; and
performing a consistency check between the graphical element category and the function type;
determining, based on the consistency check, a consistency score, wherein the consistency score is computed by dividing the number of matched keywords by the total number of function type keywords;
providing a recommendation report regarding the use of the icon, based on the consistency score;
in response to the score being below a threshold, including a warning in the recommendation report;
receiving a user override for a recommendation included in the recommendation report; and
adding keywords associated with the function type to a database including keywords corresponding to a function of the graphical element in response to a predetermined number of repetitions of the receiving the override.

18. The method of claim 1, wherein the icon is a mobile device icon.

\* \* \* \* \*